(12) United States Patent
Jung et al.

(10) Patent No.: US 11,068,054 B2
(45) Date of Patent: Jul. 20, 2021

(54) VEHICLE AND CONTROL METHOD THEREOF

(71) Applicants: Hyundai Motor Company, Seoul (KR); Kia Motors Corporation, Seoul (KR)

(72) Inventors: MuKyung Jung, Seoul (KR); Jongkyo An, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/667,252

(22) Filed: Oct. 29, 2019

(65) Prior Publication Data
US 2020/0278745 A1 Sep. 3, 2020

(30) Foreign Application Priority Data
Feb. 28, 2019 (KR) .................. 10-2019-0023889

(51) Int. Cl.
| | | |
|---|---|---|
| *G06F 3/01* | (2006.01) | |
| *G09G 3/00* | (2006.01) | |
| *B60R 11/02* | (2006.01) | |
| *B60K 35/00* | (2006.01) | |
| *B60R 11/00* | (2006.01) | |

(52) U.S. Cl.
CPC .......... *G06F 3/013* (2013.01); *B60R 11/0235* (2013.01); *G09G 3/001* (2013.01); *B60K 35/00* (2013.01); *B60K 2370/164* (2019.05); *B60K 2370/166* (2019.05); *B60K 2370/67* (2019.05); *B60K 2370/73* (2019.05); *B60R 2011/0085* (2013.01); *G09G 2380/10* (2013.01)

(58) Field of Classification Search
CPC . G06F 3/01; G06F 3/033; G06F 3/048; G06F 3/0481; G06F 3/04812; G06F 3/04817; G06F 3/04842; G06F 3/0482; G06F 3/0488
See application file for complete search history.

(56) References Cited

U.S. PATENT DOCUMENTS

| | | | | |
|---|---|---|---|---|
| 10,507,783 | B2* | 12/2019 | Rupp | ............. B60K 35/00 |
| 2002/0003571 | A1* | 1/2002 | Schofield | ............. B60R 11/0235 |
| | | | | 348/148 |
| 2003/0122782 | A1* | 7/2003 | Yamaguchi | ......... B60R 11/0235 |
| | | | | 345/158 |
| 2006/0022808 | A1* | 2/2006 | Ito | ................. G08G 1/167 |
| | | | | 340/425.5 |
| 2006/0109197 | A1* | 5/2006 | Kuwahara | ............. B60K 35/00 |
| | | | | 345/1.1 |
| 2015/0097923 | A1* | 4/2015 | Kim | ................. H04N 5/64 |
| | | | | 348/36 |

(Continued)

*Primary Examiner* — William Lu
(74) *Attorney, Agent, or Firm* — Mintz Levin Cohn Ferris Glovsky and Popeo, P.C.; Peter F. Corless

(57) ABSTRACT

The present disclosure provides a vehicle that includes a display and a rotation member that rotates the display. A vision sensing unit acquires eye position information of a user and a controller determines a first area included in a field of view of the user based on the eye position information and a rotation angle of the display. The controller then divides a display area of the display into a plurality of areas based on the first area and operates the display to display content corresponding to each of the plurality of areas.

16 Claims, 4 Drawing Sheets

(56) References Cited

U.S. PATENT DOCUMENTS

| | | | | |
|---|---|---|---|---|
| 2015/0227297 A1* | 8/2015 | Kim | ............... | G06F 1/1694 |
| | | | | 715/799 |
| 2016/0054796 A1* | 2/2016 | Cho | ............... | G06T 3/40 |
| | | | | 345/156 |
| 2016/0292919 A1* | 10/2016 | Ireland | ............... | H04L 67/22 |
| 2017/0322760 A1* | 11/2017 | Soh | ............... | B60K 37/06 |
| 2018/0231772 A1* | 8/2018 | Han | ............... | G02B 27/0101 |
| 2018/0240252 A1* | 8/2018 | Lee | ............... | G06T 7/74 |
| 2018/0364520 A1* | 12/2018 | Lee | ............... | H04N 5/64 |
| 2020/0070722 A1* | 3/2020 | Seegers | ............... | B60K 37/06 |

\* cited by examiner

VEHICLE AND CONTROL METHOD THEREOF

CROSS-REFERENCE TO RELATED APPLICATION(S)

This application claims the benefit of Korean Patent Application No. 10-2019-0023889 filed on Feb. 28, 2019, the disclosure of which is incorporated herein by reference.

TECHNICAL FIELD

The present disclosure relates to a vehicle control method, and more particularly, to a vehicle having a display and a control method thereof.

BACKGROUND

In general, a vehicle provides a variety of entertainment, such as listening to music and watching television, in addition to basic driving functions. In recent years, according to such a trend, a display device installed within the vehicle may interwork with an internal device of the vehicle such as an audio device, a video device, a navigation device, or an external device of the vehicle such as a smart phone to transmit and receive various information or to display media such as music or video. The display device of the vehicle provides convenience to a user by providing various data or information to the user in accordance with an acoustic form, visual form or a combined form thereof.

SUMMARY

The present disclosure provides a vehicle capable of playing or outputting various contents through a display and a control method thereof. Additional aspects of the disclosure will be set forth in part in the description which follows and, in part, will be obvious from the description, or may be learned by practice of the disclosure.

In accordance with one aspect of the present disclosure, a vehicle may include: a display; a rotation member configured to rotate the display; a vision sensing unit configured to detect eye position information; and a controller configured to determine a first area included in a field of view of the user based on the eye position information and a rotation angle of the display; divide a display area of the display into a plurality of areas based on the first area; and operate the display to output contents corresponding to each of the plurality of areas.

The controller may be configured to divide the display area of the display into the first area and a second area excluding the first area and display a first content in the first area and a second content in the second area. The controller may also be configured to change a division ratio of the first area and the second area based on at least one of a type, size or ratio of the second content and divide the display area of the display based on the changed division ratio.

When the eye position information is changed, the controller may be configured to change the division ratio of the first area and the second area based on the changed eye position information and the rotation angle of the display and divide the display area of the display based on the changed division ratio. The controller may be configured to operate the rotation member to rotate the display in a direction in which the width of the first area decreases when the size of the first area is greater than a first predetermined reference value.

The controller may further be configured to operate the rotation member to rotate the display in a direction in which the width of the second area increases when the size of the second area is less than a second predetermined reference value. The controller may be configured to determine a target angle of the display so that the size of the first area is equal to a third predetermined reference value when the size of the first area is greater than the third predetermined reference value and operate the rotation member to rotate the display based on the target angle of the display. The controller may then be configured to output a warning message when the target angle of the display is greater than a maximum rotation angle of the display. The controller may be configured to determine the first area based on a predetermined period.

The vehicle may further include an input device. The controller may be configured to determine the first area when a display command for the second content is received from the user. The vision sensing unit may include at least one of a camera configured to capture an image of the user or a seat manipulation device configured to adjust at least one of a position, a height or an angle of a seat. The eye position information may include at least one of the image of the user or a set value of at least one of a position, a height or an angle of the seat. The first content may include driving information related to driving, and the second content may include at least one of a digital multimedia broadcasting (DMB) video or a multimedia video. The display may be a curved display. The controller may be configured to operate the vision sensing unit to acquire the eye position information in real time, and determine the first area when the eye position information is maintained for a predetermined time.

In accordance with another aspect of the present disclosure, a control method of a vehicle may include: acquiring eye position information regarding a user's eye position; determining a first area included in a field of view of the user based on the eye position information and a rotation angle of a display; dividing a display area of the display into a plurality of areas based on the first area; and displaying contents corresponding to each of the plurality of areas.

The dividing of the display area of the display into the plurality of areas based on the first area may include dividing the display area of the display into the first area and a second area excluding the first area, and the displaying of the contents corresponding to each of the plurality of areas may include displaying a first content in the first area and a second content in the second area. Additionally, the dividing of the display area of the display into the plurality of areas based on the first area may include changing a division ratio of the first area and the second area based on at least one of a type, size or ratio of the second content; and dividing the display area of the display based on the changed division ratio.

The dividing of the display area of the display into the plurality of areas based on the first area may include when the eye position information is changed, changing the division ratio of the first area and the second area based on the changed eye position information and the rotation angle of the display; and dividing the display area of the display based on the changed division ratio. The control method may further include rotating the display in a direction in which the width of the first area decreases when the size of the first area is greater than a first predetermined reference value and rotating the display in a direction in which the width of the second area increases when the size of the second area is less than a second predetermined reference value.

A vehicle and control method of a vehicle according to an aspect provides reproducing contents corresponding to each of a viewable area and a non-viewable area of a driver, thereby enhancing the safety of driving and the convenience of a user.

DETAILED DESCRIPTION

Figure 1:
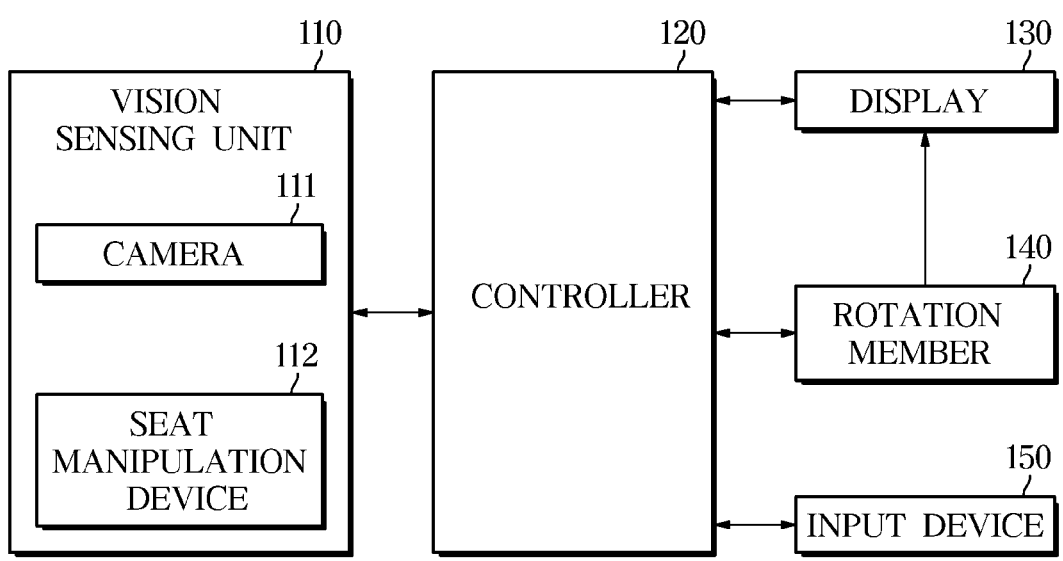
FIG. 1 is a control block diagram of a vehicle according to an exemplary embodiment of the present disclosure.

Throughout this document, the same reference numerals and symbols will be used to designate the same or like components. In the following description of the present disclosure, detailed descriptions of known functions and configurations incorporated herein will be omitted when the subject matter of the present disclosure may be rendered rather unclear. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

It will be further understood herein that, when a portion is referred to as being "connected to" another portion, not only can it be "directly connected to" the other portion, but it can also be "indirectly connected to" the other portion. When the portion is referred to as being indirectly connected to the other portion, the portion may be connected to the other portion via a wireless communications network. It will be understood that the terms "comprise," "include," "have," and any variations thereof used herein are intended to cover non-exclusive inclusions unless explicitly described to the contrary. Although the terms "first," "second," "A," "B," etc. may be used to describe various components, the terms do not limit the corresponding components, but are used only for the purpose of distinguishing one component from another component.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Descriptions of components in the singular form used herein are intended to include descriptions of components in the plural form, unless explicitly described to the contrary. The reference numerals or symbols in respective stages are only used to distinguish the respective stages from the other stages, and do not necessarily describe an order of the respective stages. The respective stages may be performed in a different order from the described order, unless a specific order is described in the context.

Hereinafter, exemplary embodiments of a vehicle and a control method thereof according to an aspect of the present disclosure will be described in detail with reference to the accompanying drawings.

Figure 2:
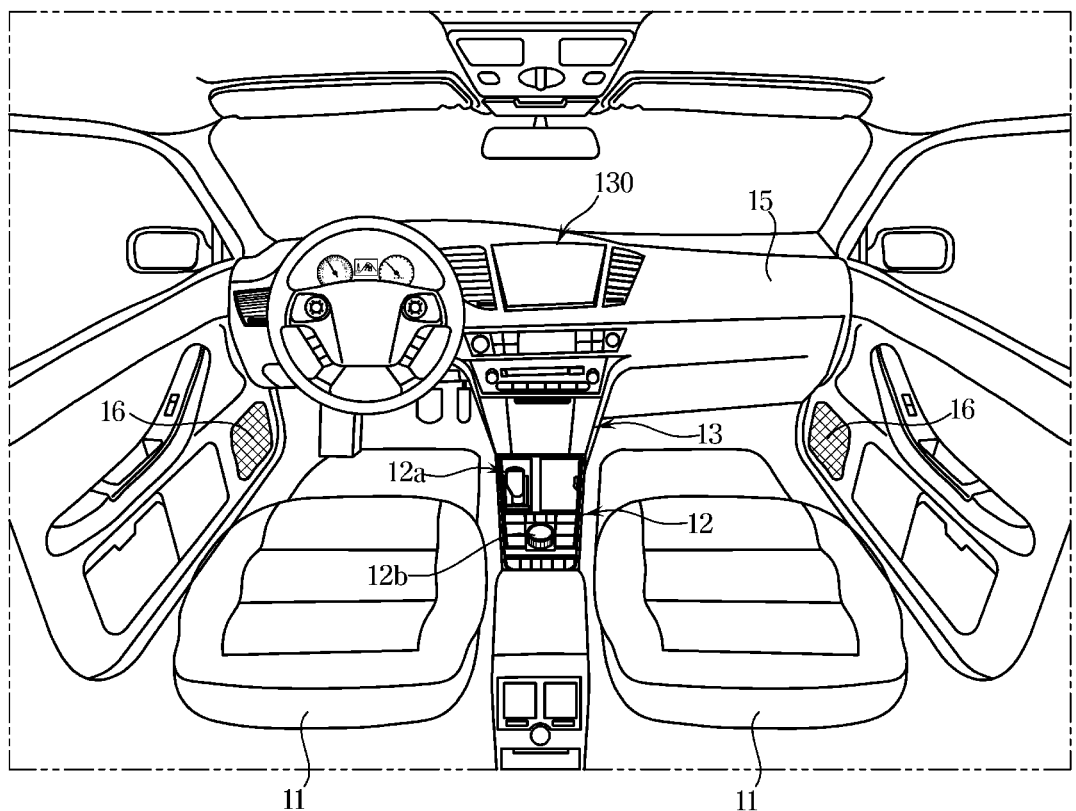
FIG. 2 is a view showing an internal configuration of a vehicle according to an exemplary embodiment of the present disclosure.

FIG. 1 is a control block diagram of a vehicle according to an exemplary embodiment of the present disclosure and FIG. 2 is a view showing an internal configuration of a vehicle according to an exemplary embodiment of the present disclosure. Referring to FIGS. 1 and 2, a vehicle 100 according to an exemplary embodiment may include a vision sensing unit 110 configured to obtain eye position information of a user, a controller 120 configured to execute overall operations of internal components of the vehicle 100, a display 130, a rotation member 140 configured to rotate the display 130, and an input device 150 configured to receive various inputs from the user.

The vision sensing unit 110 may be configured to acquire eye position information related to the user's eye position. The eye position information may include at least one of image information regarding the eye position of the user or position information of a seat 11 about the posture of the user. Specifically, the eye position information may include at least one of the image of the user regarding the eye position of the user or a set value of at least one of a position, a height or an angle of the seat 11.

To detect eye position information, the vision sensing unit 110 may include a camera 111 configured to capture the image of the user and a seat manipulation device 112 configured to detect information regarding an attitude of the user. At this time, the user may refer to a driver located in a driver's seat, but the user is not limited thereto and may further include a passenger. The camera 111 may be configured to acquire visual information related to the position of the user's head or eyes by photographing the image of the user. Accordingly, the camera 111 may be disposed within an area within the vehicle 100 in which the driver's eyes may be captured. For example, the camera 111 may be installed adjacent to a rearview mirror (not shown) or installed on a ceiling above the driver's seat.

In addition, the camera 111 may be disposed adjacent to the display 130 to obtain information regarding the user's gaze towards the display 130. For this purpose, the camera 111 may be implemented as an image sensor configured to convert image information transmitted by ultraviolet, visible, infrared, or X-ray input into an electrical signal. For example, the camera 111 may be implemented by a CCD (Charge Coupled Device) or a CMOS (Complementary Metal-oxide Semiconductor) sensor, or may be implemented by an infrared sensor.

The seat manipulation device 112 may be configured to move the position of the seat 11 and adjust at least one of a position, height, or angle of the seat 11 in the anteroposterior direction. Additionally, the seat manipulation device 112 may be configured to move the seat 11 to adjust the seat 11 to a position having a predetermined seat value when the user enters and exits the vehicle 100 or sits on the seat 11 of the vehicle 100. In particular, the seat value refers to the position information of the seat 11, and may be transmitted to the controller 120 and used as a control basis. The eye position information including at least one of the image information of the user acquired by the vision sensing unit 110 or the position information of the seat 11 may be transmitted to the controller 120 and may be utilized as a control basis of the vehicle 100.

As shown in FIG. 2, the interior of the vehicle 100 includes the seat 11 on which the driver or passenger sits, a dashboard 15 provided with a gear box 12, a center fascia 13 or a steering wheel 14. The gear box 12 may include a shift lever 12a for shifting the vehicle 100 and a dial operation unit 12b for executing the performance of the vehicle 100. The dial operation unit 12b may be used as the input device 150 for receiving operation commands for various functions of the vehicle 100. Additionally, the dial operation unit 12b may include at least one physical button such as an on/off button for various functions and a button for changing setting values of various functions. The input device 150 may be configured to transmit an operation signal of the button to an electronic controller unit (ECU), an audio video navigation (AVN) device, or the like.

Additionally, the input device 150 may include a touch panel integrally provided on the display 130 and may further include a jog dial (not shown) or a touch pad (not shown) for inputting a movement command and a selection command for a cursor displayed on the display unit of the AVN device. In particular, the jog dial or the touch pad may be disposed in the center fascia 13 or the like. Alternatively, the input device 150 may be disposed on the steering wheel 14 according to the embodiment.

The input device 150 may include a hardware apparatus, such as various buttons or switches, pedals, a keyboard, a mouse, a track ball, a lever, a handle, and a stick, for the user's inputs. In addition, the input device 150 may include a Graphic User Interface (GUI), that is, a software apparatus, such as a touch pad, for the user's inputs. The touch pad may be implemented as a Touch Screen Panel (TSP) to form an inter-layer structure with the display 130. The display 130 may also be used as the input device 150 when the display 130 is implemented as the TSP forming the inter-layer structure with the touch pad.

The display 130 may be installed on the center fascia 13 provided on the dashboard 15. The display 130 may be configured to display a UI (User Interface) that provides the driver with information related to the vehicle 100 in the form of images or text. Accordingly, the display 130 may be embedded in the center fascia 13. However, the display 130 is not limited thereto, and the display 130 may be detachable from the center fascia 13 of the vehicle 100. In addition, the display 130 may be configured to display various control screens related to operating the devices installed within the vehicle 100. For example, the display 130 may be configured to display various control screens related to adjusting the seat 11 and the side mirrors.

Further, the display 130 may be used as a navigation device, and the navigation device which corresponds to the AVN (Audio Video Navigation) device may integrally perform audio, video, and navigation functions. The display 130 may be a Cathode Ray Tube (CRT), a Digital Light Processing (DLP) panel, a Plasma Display Panel (PDP), a Light Crystal Display (LCD) panel, an Electro Luminescence (EL) panel, an Electrophoretic Display (EPD) panel, an Electrochromic Display (ECD) panel, a Light Emitting Diode (LED) panel, or an Organic Light Emitting Diode (OLED) panel, although not limited to these.

The display 130 may be implemented as a curved display having a predetermined curvature. However, the display 130 is not limited to this, and may be implemented by a flat display. In addition, the display 130 may be configured to be rotatable. Accordingly, the vehicle 100 may include the rotation member 140 configured to rotate the display 130. The rotation member 140 (FIG. 1) may be provided so that the display 130 may be rotated to the left and right with respect to the vertical rotation axis. The rotation member 140 may be configured to adjust the rotation angle to rotate the display 130 by a predetermined rotation angle to the left and right about the vertical rotation axis. For this purpose, the rotation member 140 may include a driving motor and may further include at least one connection arm for transmitting power from the driving motor to the display 130.

The controller 120 may be configured to determine an area in which the user may obtain the visual information provided by the display 130, that is, an area included in the user's field of view (hereinafter, referred to as 'viewable area'), based on the eye position information and the rotation angle of the display 130. The viewable area refers to an area that may be viewed by the user, that is, an area in which the user may obtain the visual information from among the display area of the display 130.

Specifically, the controller 120 may be configured to determine the eye position of the user based on the eye position information, and determine the user's field of view, that is, the range in which the user may acquire the visual information, based on the eye position of the user. For this, the controller 120 may be configured to determine the head or eye position of the user based on at least one of the image information about the eye position of the user transmitted from the vision sensing unit 110 or the position information of the seat 11 about the posture of the user.

The controller 120 may be configured to detect the user's head or eyes based on the image of the user acquired by the camera 111 and determine a positional value with respect to the detected head or eyes of the user. At this time, the positional value for the head or eyes of the user may be determined as a coordinate value for a predetermined origin position. In addition, the controller 120 may be configured to determine a predetermined position with respect to a reference point positioned at a predetermined distance ahead or upward from a rear end of the seat 11 as the user's head or eye position, by using the position information of the seat 11. The controller 120 may then be configured to determine the user's head or eye position using the height of the user's head or eyes from the seat 11 obtained from the camera 111, or using standard human body information data according to the height of a user stored in advance.

The controller 120 may be configured to determine the position of the left eye or the right eye of the user, respectively, and determine the coordinate value of the left eye or the right eye of the user. Alternatively, the controller 120 may be configured to determine a value obtained by applying a predetermined weight to the positions of the left eye or the right eye, or an average value of the position of the left eye and the right eye, as the eye position. The vision sensing unit 110 (e.g., a sensor or a plurality of sensors operating together) may be configured to perform an operation of determining the position of the user's head or eyes. In particular, the vision sensing unit 110 may be configured to determine the head or eye position of the user and transmit the determined the user's head or eye position to the controller 120. The controller 120 may be configured to determine a viewable area in which the user may obtain visual information from the display 130 based on the transmitted head or eye position of the user.

In addition, the controller 120 may be configured to divide the display area of the display 130 into a plurality of areas based on the viewable area. Specifically, the controller 120 may be configured to divide the display area of the display 130 into the viewable area included in the field of view of the user and an area excluding the viewable area (hereinafter, referred to as 'unviewable area'). At this time, the unviewable area may be a display area that is not included in the field of view of the user, and may refer to an area where the user is unable to obtain visual information.

The controller 120 may also be configured to operate the display 130 to display or output content that corresponds to each of the plurality of divided areas. The controller 120 may be configured to operate the rotation member 140 to rotate the display 130 based on the size of the divided area of the display 130. The specific operation of the controller 120 will be described later.

The controller 120 may include a memory (not shown) for storing data regarding an algorithm for executing the operations of the components of the vehicle 100 or a program that represents the algorithm, and a processor (not shown) that performs the above described operations using the data stored in the memory. At this time, the memory and the processor may be implemented as separate chips. Alternatively, the memory and the processor may be implemented on a single chip.

Alternatively, when the vision sensing unit 110 determines the head or eye position of the user, the vision sensing unit 110 may include a memory (not shown) for storing data regarding an algorithm for determining the head or eye position of the user or a program that represents the algorithm, and a processor (not shown) that performs the above described operations using the data stored in the memory. At this time, the memory and the processor may be implemented as separate chips. Alternatively, the memory and the processor may be implemented on a single chip.

Additionally, a speaker 16 configured to output sound may be further included within the vehicle 100. Accordingly, the vehicle 100 may be configured to output sounds necessary for performing the audio function, the video function, the navigation function, and other additional functions through the speaker 16. The vehicle 100 may further include a communication unit (not shown) configured to exchange information that may be utilized as various control bases from inside or outside the vehicle 100. Accordingly, the communication unit (not shown) may include one or more components for enabling communication with an internal or external device. For example, the communication unit (not shown) may include at least one of a short-range communication module, a wired communication module, or a wireless communication module.

The vehicle 100 may further include a storage device (not shown). The storage device (not shown) may be configured to store various information related to the vehicle 100. The storage device may be implemented as at least one of a non-volatile memory device (for example, a cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these. The storage device may be a memory implemented as a separate chip from the processor described above in regard of the controller 120, or the storage device and the processor may be integrated into a single chip.

Meanwhile, it would be understood by those skilled in the art that at least one component may be added or omitted to correspond to the performance of the components of the vehicle 100 shown in FIG. 1. In addition, the mutual positions of the components may be changed to correspond to the performance or structure of the system. Additionally, each of the components shown in FIG. 1 may refer to at least one piece of hardware, such as a field-programmable gate array (FPGA) or an application specific integrated circuit (ASIC), at least one piece of software stored in a memory, or at least one process processed by a processor.

Figure 3:
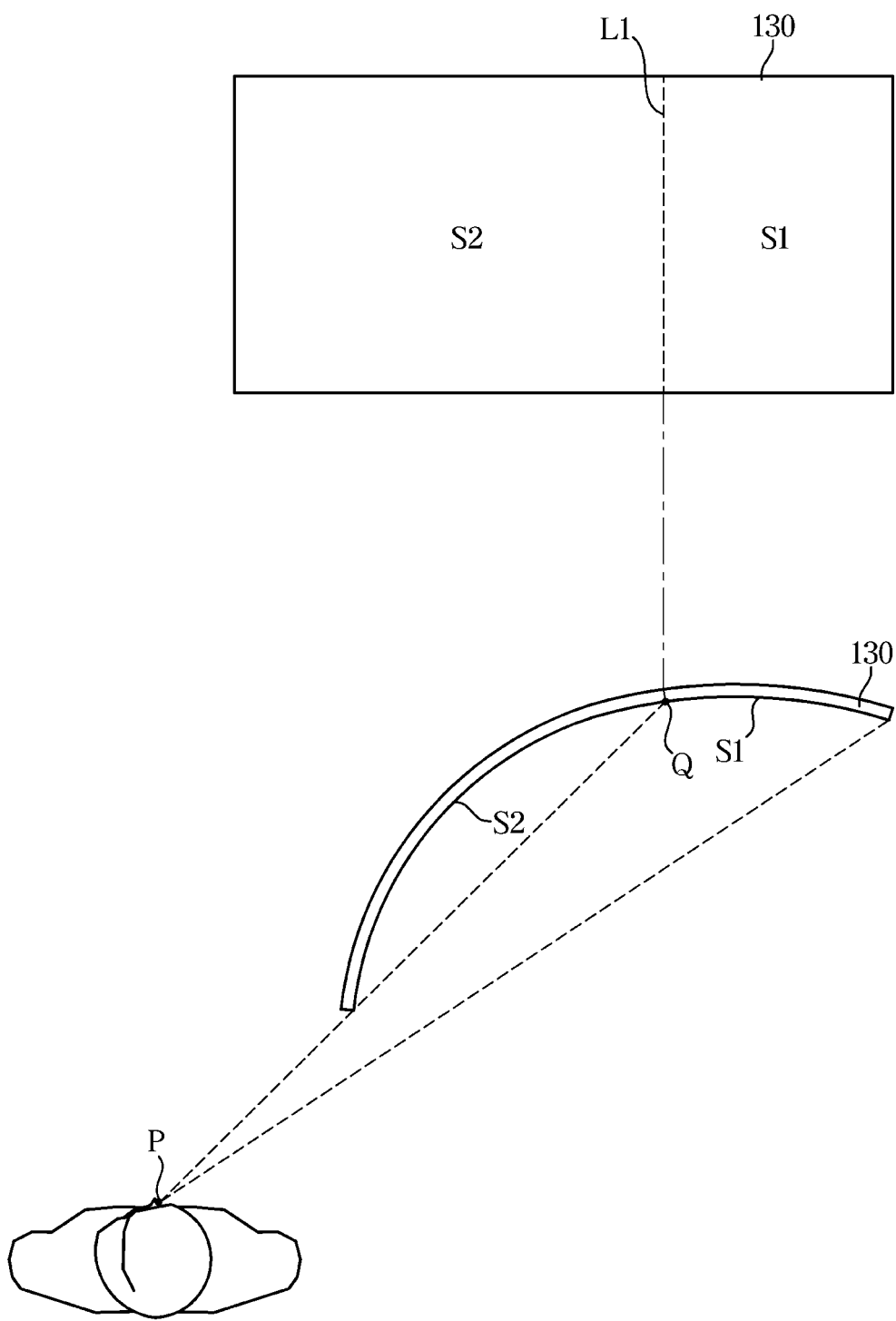
FIG. 3 is a view for explaining a process for determining a viewable area of a vehicle and dividing a display area of a display according to an exemplary embodiment of the present disclosure.

Hereinafter, the specific operation of the controller 120 will be described in detail with reference to FIG. 3. FIG. 3 is a view illustrating a process for determining a viewable area of a vehicle and dividing a display area of a display according to an exemplary embodiment of the present disclosure. Referring to FIG. 3, the controller 120 may be configured to determine the viewable area from among display areas S1 and S2 of the display 130 based on the head or eye position of a user and the rotation angle of the display 130. In particular, the rotation angle of the display 130 may refer to an angle by which the display 130 rotates with respect to the rotation axis of the display 130.

The controller 120 may be configured to determine a straight line (e.g., virtual line) that connects the left or right end of the display 130 from the user's head or an eye position P and determine the viewable area based on the position where the determined straight line meets or intersects with the display 130. Particularly, the left or right end of the display 130 may vary based on the rotation angle of the display 130. The controller 120 may be configured to determine the straight line connecting the left or right end of the display 130 based the rotation angle of the display 130 from the user's head or the eye position P. The controller 120 may also be configured to determine the range between a left straight line and a right straight line as the range of the visual acuity of the user.

Further, the controller 120 may be configured to determine an area within the range of the visual acuity of the user from among the display area, as the viewable area. At this time, the controller 120 may be configured to determine the viewable area differently based on the position of the driver. As shown in FIG. 3, for example, when the driver is positioned to the left of the display 130 and the display 130 is rotated to the left, the controller 120 may be configured to determine the viewable area to be the display area S1 between a meeting position Q where the straight line connecting the left end of the display 130 and the user's head or the eye position P meets the display area of the display 130 and the right end of the display 130.

In other words, the controller 120 may be configured to determine the display area S1 on the right side of a virtual vertical line L1 positioned at the meeting position Q where the straight line connecting the left end of the display 130 and the user's head or the eye position P meets the display area of the display 130, as the viewable area. Additionally, the controller 120 may be configured to determine the display area S2 on the left side of the virtual vertical line L1 positioned at the meeting position Q where the straight line connecting the left end of the display 130 and the user's head or the eye position P meets the display area of the display 130, as the unviewable area.

In another example, when the driver is positioned to the right of the display 130 and the display 130 is rotated to the right, the controller 120 may be configured to determine the viewable area to be a display area between a meeting position where the straight line connecting the right end of the display 130 and the user's head or eye position meets the display area of the display 130 and the left end of the display 130.

In other words, the controller 120 may be configured to determine the display area on the left side of a virtual vertical line positioned at a meeting position where the straight line connecting the right end of the display 130 and the user's head or eye position meets the display area of the display 130, as the viewable area. Additionally, the controller 120 may be configured to determine the display area on the right side of a virtual vertical line positioned at a meeting position where the straight line connecting the right end of the display 130 and the user's head or the eye position P meets the display area of the display 130, as the unviewable area.

The controller 120 may then be configured to divide the display area of the display 130 into a plurality of areas based on the viewable area. Specifically, the controller 120 may be configured to divide the display area of the display 130 into a viewable area S1 and an unviewable area S2 excluding the viewable area S1. In particular, the controller 120 may be configured to operate the display 130 to reproduce content that corresponds to each of a plurality of divided regions based on the type of contents to be displayed on the display 130. The controller 120 may be configured to display a predetermined first content in the viewable area S1 and display a predetermined second content in the viewable area S2.

The first content may be content that is not restricted to be displayed while driving, and may be content that provides a predetermined type of information. In other words, the first content may include information that does not disturb driving. For example, the first content may include driving information related to driving, such as driving directions or speed limit information. The second content may be content that is restricted to be displayed while driving, and may be content that provides the predetermined type of information. In other words, the second content may include content that disturbs or distracts a user from driving. For example, the second content may include information such as a DMB image, a multimedia image, and the like.

The types of the first content and the second content may be predetermined in designing of the vehicle system or may be determined based on information received by an external device by the communication unit (not shown). The types of the first content and the second content may be updated in accordance with a predetermined time period. The controller 120 may be configured to display the first content in the viewable area S1 and the second content in the unviewable area S2 and thus, the driver only views the content that is not restricted to be displayed while driving to improve driving safety. At the same time, the content that is not related to driving may be displayed in the unviewable area, to provide convenience to the passenger.

In addition, the controller 120 may be configured to change the division ratio of the first area and the second area based on the type, size, or ratio of the second contents. The controller 120 may be configured to divide the display area of the display 130 based on the changed division ratio. For example, when the type of the second content is the multimedia video including captions, the controller 120 may be configured to change the division ratio on the display area of the display 130 to increase the size of the unviewable area.

As another example, when the size of the second content is greater than the divided unviewable area, the controller 120 may be configured to change the division ratio on the display area of the display 130 to increase the size of the unviewable area. As another example, the controller 120 may be configured to change the division ratio of the display area of the display 130 based on the ratio of the second contents, and divide the display area of the display 130 based on the changed division ratio.

In addition, the controller 120 may be configured to determine whether the user's head or eye position is changed by determining the user's head or eye position based on a real-time or predetermined period. When the user's head or eye position is changed, the field of view of the user may be changed, and thus, the controller 120 may be configured to change the division ratio of the display area of the display 130 based on the changed user's head or eye position and the rotation angle of the display 130. The controller 120 may be configured to divide the display area of the display 130 based on the changed division ratio.

Particularly, the controller 120 may be configured to determine the viewable area according to the real-time or predetermined period and divide the display area of the display 130 based on the division ratio which is changed based on the viewable area. Accordingly, the controller 120 may be configured to operate the vision sensing unit 110 to acquire the eye position information in real time. When the eye position information is maintained for a predetermined period of time, the controller 120 may be configured to determine the viewable area and divide the display area of the display 130 based on the division ratio which is changed based on the viewable area.

On the other hand, when the head or eye position of the user is changed or the division ratio is changed, the second content that may interrupt driving may enter the field of view of the user. In particular, it is necessary for the passenger other than the driver to continue to watch the second content.

Hereinafter, an operation for the controller 120 to rotate the display 130 will be described. The controller 120 may be configured to operate the rotation member 140 to rotate the display 130 based on the size of the divided area of the display 130. Specifically, when the size of the viewable area is greater than a first reference value, which is predetermined, the controller 120 may be configured to operate the rotation member 140 to rotate the display 130 in a direction in which the width of the viewable area decreases. In particular, the first reference value may refer to a maximum reference size of the viewable area and may be determined to have a predetermined ratio with respect to the size of the display area of the display 130. In addition, the direction in which the width of the viewable area decreases may vary based on the position of the driver.

For example, when the driver is located on the left side of the display 130 and the display 130 is rotated to the left as shown in FIG. 3, the direction in which the width of the viewable area S1 decreases may be to the left. The controller 120 may thus be configured to operate the rotation member 140 to rotate the display 130 to the left, and the width of the viewable area S1 may be reduced.

As another example, when the driver is located on the right side of the display 130 and the display 130 is rotated to the right, the direction in which the width of the viewable area decreases may be to the right. The controller 120 may thus be configured to operate the rotation member 140 to rotate the display 130 to the right, and the width of the viewable area may be reduced.

Additionally, when the size of the unviewable area is less than a second reference value, which is predetermined, the controller 120 may be configured to operate the rotation member 140 to rotate the display 130 in a direction in which the width of the unviewable area increases. Particularly, the second reference value may refer to a minimum reference size of the unviewable area and may be predetermined to have a predetermined ratio with respect to the size of the display area of the display 130. The direction in which the width of the unviewable area increases may vary based on the position of the driver.

For example, as shown in FIG. 3, when the driver is located on the left side of the display 130 and the display 130 is rotated to the left, the direction in which the width of the unviewable area S2 increases may be to the left. The controller 120 may thus be configured to operate the rotation member 140 to rotate the display 130 to the left, and the area of the unviewable area S2 may be increased.

As another example, when the driver is located on the right side of the display 130 and the display 130 is rotated to the right, the direction in which the width of the unviewable area increases may be to the right. The controller 120 may thus be configured to operate the rotation member to rotate the display 130 to the right, and the area of the unviewable area may be increased.

In addition, when the size of the viewable area is greater than a third reference value, which is predetermined, the controller 120 may be configured to determine the target angle of the display 130 to adjust the size of the viewable area to correspond to the third reference value and operate the rotation member 140 to rotate the display 130 based on the target angle of the display 130. The third reference value may refer to a width of the viewable area for securing a minimum unviewable area, and may be the same value as the first reference value. However, the third reference value is not limited to this and may be less than the first reference value. The controller 120 may be configured to determine the target angle of the display 130 to adjust the size of the viewable area to correspond to the third reference value based on the user's head or eye position and the rotation angle of the display 130.

When the target angle is greater than a maximum rotation angle of the display 130, the unviewable area may not be secured. Therefore, the controller 120 may be configured to output the warning message visually or audibly to prevent the second content from being viewable to the driver. Alternatively, the controller 120 may be configured to operate the display 130 to stop displaying the second content or not to provide the visual information of the second content. Accordingly, it may be possible to prevent the driver from deliberately changing posture to view the second content, thereby enhancing driving safety.

Furthermore, when the target angle is equal to or less than the maximum rotation angle of the display 130, the unviewable area may be secured. Accordingly, the controller 120 may facilitate the convenience of the passengers by displaying the second content in the unviewable area. In particular, the controller 120 may be configured to provide the driver with information necessary for driving by displaying the first content in the viewable area except in the viewable area among the display area of the display 130. Therefore, the driving safety may be increased. On the other hand, when the eye position information acquired in real time or according to a predetermined period is maintained for a predetermined time, the controller 120 may be configured to operate the rotation member 140 to rotate the display 130 based on the viewable area described above.

Figure 4:
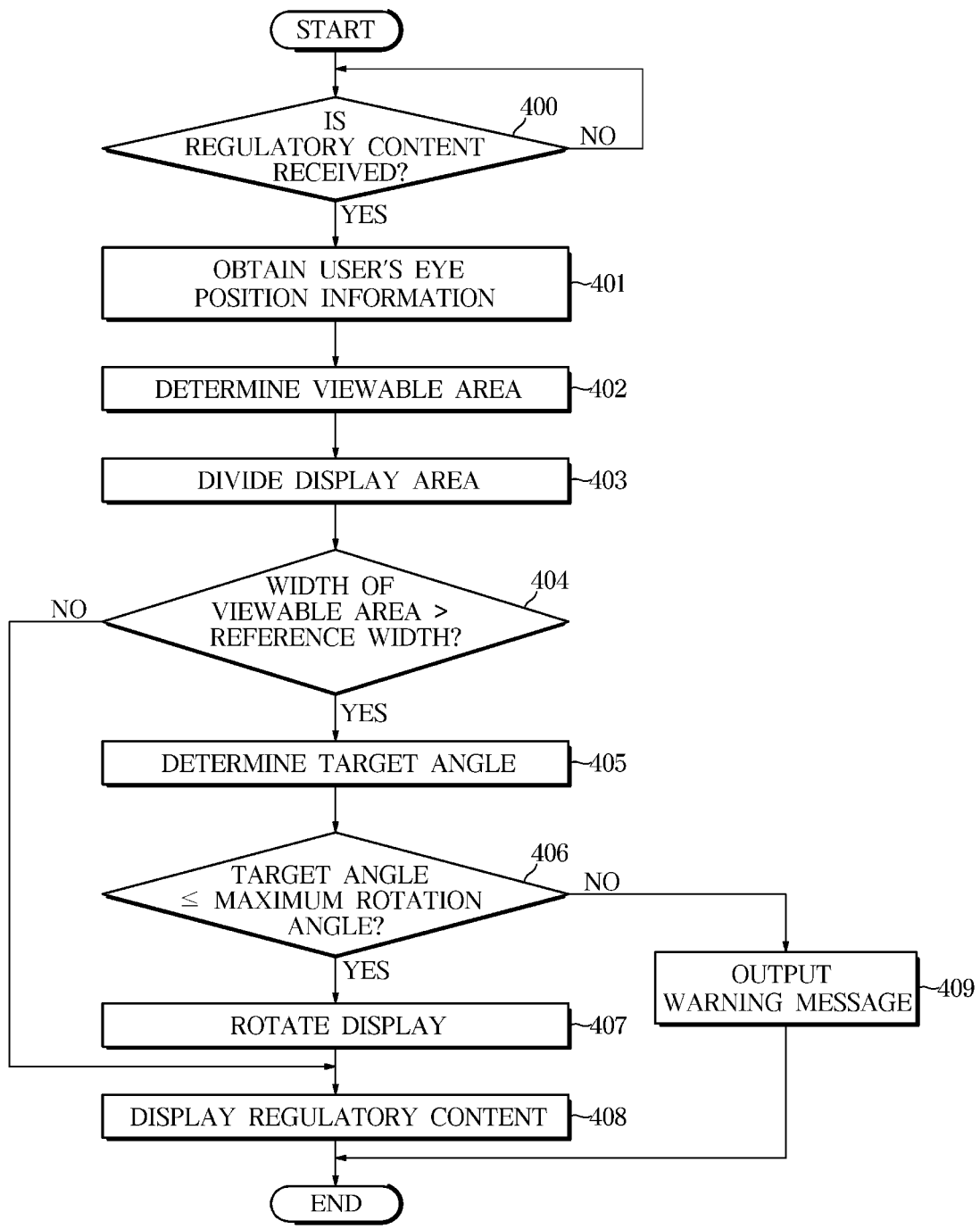
FIG. 4 is a flowchart illustrating a control method of a vehicle according to an exemplary embodiment of the present disclosure.

FIG. 4 is a flowchart illustrating a control method of a vehicle according to an exemplary embodiment of the present disclosure. The method described herein below may be executed by a controller. Referring to FIG. 4, the vehicle 100 according to an exemplary embodiment may be configured to determine whether a command for displaying regulatory content is received (400). The regulatory content may refer to content providing the predetermined type of information, and may include content that does not disturb or distract from driving. For example, the regulatory content may include information such as a DMB video, a multimedia video, and the like.

When the command for displaying the regulatory content is received (YES in 400), the vehicle 100 may be configured to obtain the eye position information of a user (401). The eye position information may include at least one of image information about the eye position of the user or position information of the seat 11 about the posture of the user. Specifically, the eye position information may include at least one of the image of the user regarding the eye position of the user or a set value of at least one of a position, a height or an angle of the seat 11.

The vehicle 100 may be configured to determine the viewable area of the display area of the display 130 based on the eye position information and the rotation angle of the display 130 (402). In particular, the rotation angle of the display 130 may refer to an angle by which the display 130 rotates with respect to the rotation axis of the display 130. The vehicle 100 may be configured to determine the user's eye position based on the eye position information, and determine the user's field of view, that is, the range in which the user may acquire the visual information, based on the eye position of the user. For this, the vehicle 100 may be configured to determine the head or eye position of the user based on at least one of the image information about the eye position of the user or the position information of the seat 11 about the posture of the user.

The vehicle 100 may then be configured to detect the user's head or eyes based on the image of the user acquired by the camera 111 and determine the positional value with respect to the detected head or eyes of the user. The positional value for the head or eyes of the user may be determined as a coordinate value for a predetermined origin position. In addition, the vehicle 100 may be configured to determine a predetermined position with respect to a reference point positioned at a predetermined distance ahead or upward from a rear end of the seat 11 as the user's head or eye position, using the position information of the seat 11. At this time, the vehicle 100 may be configured to determine the user's head or eye position using the height of the user's head or eyes from the seat 11 obtained from the camera 111, or using standard human body information data according to the height of a user stored in advance.

The vehicle 100 may be configured to determine the position of the left eye or the right eye of the user, respectively, and determine the coordinate value of the left eye or the right eye of the user. Alternatively, the vehicle 100 may be configured to determine a value obtained by applying a predetermined weight to the positions of the left eye or the right eye, or an average value of the position of the left eye and the right eye, as the eye position. The vehicle 100 may be configured to determine a straight line (e.g., a virtual line) connecting the left or right end of the display 130 from the user's head or eye position and determine the viewable area based on the position where the determined straight line meets or intersects the display 130.

In particular, the left or right end of the display 130 may vary based on the rotation angle of the display 130. The vehicle 100 may be configured to determine the straight line connecting the left or right end of the display 130 based on the rotation angle of the display 130 from the user's head or eye position. The vehicle 100 may also be configured to determine the range between the left straight line and the right straight line as the range of the visual acuity of the user.

The vehicle 100 may be configured to determine an area within the range of the visual acuity of the user from among the display area, as the viewable area. In particular, the vehicle 100 may be configured to determine the viewable area to be a display area between a meeting position where the straight line connecting the left end of the display 130 and the user's head or eye position meets the display area of the display 130 and the right end of the display 130.

Once the viewable area is determined, the vehicle 100 may be configured to divide the display area of the display 130 into a plurality of areas based on the viewable area (403). Specifically, the vehicle 100 may be configured to divide the display area of the display 130 into the viewable area included in the field of view of the user and an area excluding the viewable area (hereinafter, referred to as 'unviewable area'). The viewable area may be a display area that is not included in the field of view of the user, and may refer to an area from which the user is unable to obtain visual information.

When the display area is divided (403), the vehicle 100 may be configured to determine whether the width of the viewable area exceeds a reference width (404). In particular, the reference width may refer to a width of the viewable area for securing a minimum unviewable area, and may be predetermined (e.g., predefined, preset, etc.). When the width of the viewable area exceeds the reference width (YES in 404), the vehicle 100 may be configured to determine a target angle at which the width of the viewable area becomes the reference width (405).

The vehicle 100 may be configured to determine whether the determined target angle is less than or equal to a maximum rotation angle of the display 130 (406). The maximum rotation angle of the display 130 may be a maximum rotation angle of the rotation member 140. When the target angle is less than or equal to the maximum rotation angle of the display 130 (YES in 406), the vehicle 100 may be configured to rotate the display 130 based on the target angle (407).

Further, the vehicle 100 may be configured to display predetermined content in the viewable area except for the unviewable area of the display area of the display 130 and display the regulatory content in the unviewable area (408). The content to be displayed in the viewable area may be content restricted to be displayed while driving and may be preset by the user or the external device. For example, the content to be displayed in the viewable area may be determined as content providing driving information related to driving, such as driving directions. As a result, the regulatory content may not be viewed by the driver, and the passenger may view the regulatory content regardless of whether the passenger is driving. Accordingly, the convenience of the passenger and the driving safety increases at the same time.

As another example, when the target angle is greater than the maximum rotation angle of the display 130 (NO in 406), the vehicle 100 may be configured to output a warning message visually or audibly (409). Alternatively, the vehicle 100 may be configured to stop displaying the regulatory content, or may not provide the visual information of the regulatory content. Therefore, it may be possible to prevent the driver from deliberately changing posture to view the regulatory content, thereby enhancing driving safety.

As another example, when the area of the viewable area is less than a reference width (NO in 404), the unviewable area for displaying the regulatory content is secured. Accordingly, the vehicle 100 may be configured to display the regulatory content in the unviewable area (408). As a result, the regulatory content is displayed in the unviewable area of the driver, irrespective of driving, and thus, the convenience of the passenger and the safety of driving may be increased.

Exemplary embodiments disclosed herein may be implemented in the form of a recording medium in which computer-readable instructions are stored. Instructions may be stored in the form of program codes, and when executed by a processor, may perform the operations of the exemplary embodiments disclosed herein by generating program modules. The recording medium may be implemented as a computer readable record medium.

The non-transitory computer-readable recording medium may be any type of recording medium in which computer-readable instructions are stored. For example, the computer-readable recording medium may be, but is not limited to, read only memory (ROM), random access memory (RAM), a magnetic tape, a magnetic disk, flash memory, and an optical data storage.

The foregoing descriptions and the accompanying drawings have been presented in order to explain the certain principles of the present disclosure. A person skilled in the art to which the present disclosure relates could make various modifications and variations by combining, dividing, substituting for, or changing the elements without departing from the principle of the present disclosure. The foregoing exemplary embodiments disclosed herein shall be interpreted as being illustrative, while not being limitative, of the principle and scope of the present disclosure.

What is claimed is:

1. A vehicle, comprising:
   a display;
   a rotation member configured to rotate the display;
   a vision sensing unit configured to acquire eye position information of a user; and
   a controller configured to:
      determine a first area included in a field of view of the user based on the eye position information and a rotation angle of the display;
      divide a display area of the display into a plurality of areas based on the first area, wherein the controller is configured to:
   wherein the controller is further configured to:
      divide the display area of the display into the first area and a second area that excludes the first area, and
      display a first content in the first area and a second content in the second area, and
   wherein the controller is configured to change a division ratio of the first area and the second area based on at least one of a type, a size, and a ratio of the second content and divide the display area of the display based on the changed division ratio.

2. The vehicle of claim 1, wherein, when the eye position information is changed, the controller is configured to change the division ratio of the first area and the second area based on the changed eye position information and the rotation angle of the display and divide the display area of the display based on the changed division ratio.

3. The vehicle of claim 1, wherein the controller is configured to operate the rotation member to rotate the display in a direction in which a width of the first area decreases when a size of the first area is greater than a first predetermined reference value.

4. The vehicle of claim 1, wherein the controller is configured to operate the rotation member to rotate the display in a direction in which a width of the second area increases when a size of the second area is less than a second predetermined reference value.

5. The vehicle of claim 1, wherein the controller is configured to determine a target angle of the display to adjust a size of the first area to be equal to a third predetermined reference value when the size of the first area is greater than the third predetermined reference value and operate the rotation member to rotate the display based on the target angle of the display.

6. The vehicle of claim 5, wherein the controller is configured to output a warning message when the target angle of the display is greater than a maximum rotation angle of the display.

7. The vehicle of claim 1, wherein the controller is configured to determine the first area based on a predetermined period.

8. The vehicle of claim 1, further comprising:
an input device,
wherein the controller is configured to determine the first area when a display command for the second content is received from the user.

9. The vehicle of claim 1, wherein the vision sensing unit includes at least one of a camera configured to capture an image of the user and a seat manipulation device configured to adjust at least one of a position, a height or an angle of a seat, and wherein the eye position information includes at least one of the image of the user or a set value of at least one of a position, a height, and an angle of the seat.

10. The vehicle of claim 1, wherein the first content includes driving information related to driving, and the second content includes at least one of a digital multimedia broadcasting (DMB) video or a multimedia video.

11. The vehicle of claim 1, wherein the display is a curved display.

12. The vehicle of claim 3, wherein the controller is configured to operate the vision sensing unit to acquire the eye position information in real time, and determine the first area when the eye position information is maintained for a predetermined period of time.

13. A control method of a vehicle, comprising:
acquiring, by a controller, eye position information of a user;
determining, by the controller, a first area included in a field of view of the user based on the eye position information and a rotation angle of a display;
dividing, by the controller, a display area of the display into a plurality of areas based on the first area;
dividing, by the controller, the display area of the display into the first area and a second area that excludes the first area, and
displaying, by the controller, a first content in the first area and a second content in the second area,
wherein the dividing of the display area of the display into the plurality of areas based on the first area includes;
changing, by the controller, a division ratio of the first area and the second area based on at least one of a type, a size, and a ratio of the second content; and
dividing, by the controller, the display area of the display based on the changed division ratio.

14. The control method of claim 13, wherein the dividing of the display area of the display into the plurality of areas based on the first area includes:
when the eye position information is changed, changing, by the controller, the division ratio of the first area and the second area based on the changed eye position information and the rotation angle of the display; and
dividing, by the controller, the display area of the display based on the changed division ratio.

15. The control method of claim 13, further comprising:
rotating, by the controller, the display in a direction in which a width of the first area decreases when a size of the first area is greater than a first predetermined reference value.

16. The control method of claim 13, further comprising:
rotating, by the controller, the display in a direction in which a width of the second area increases when a size of the second area is less than a second predetermined reference value.

* * * * *